March 16, 1971 C. W. GREEN 3,570,178
PRODUCING MOVEMENTS IN MODEL FIGURES
Filed Jan. 6, 1969 3 Sheets-Sheet 1

CHARLES WILLIAM GREEN, Inventor

By. Wenderoth, Lind & Ponack
Attorneys

CHARLES WILLIAM GREEN, Inventor

By. Wenderoth, Lind & Ponack
Attorneys

United States Patent Office  3,570,178
Patented Mar. 16, 1971

3,570,178
PRODUCING MOVEMENTS IN MODEL FIGURES
Charles William Green, Bushey, England, assignor to Halas and Batchelor Cartoon Films Limited, London, England
Filed Jan. 6, 1969, Ser. No. 789,297
Claims priority, application Great Britain, Jan. 11, 1968, 1,648/68
Int. Cl. A63h 33/26
U.S. Cl. 46—243                          6 Claims

ABSTRACT OF THE DISCLOSURE

In a model figure for producing related sound and movement effects the lips are movable and are each connected to an electromechanical transducer through a pivoted lever. Electric signals corresponding to sound are averaged by an averaging circuit and applied to the transducers so that the extent of movement of the lips by the transducers corresponds to the sound from which the electric signals are derived. The electric signals also operate a loud speaker.

---

The invention relates to the production of movement in model figures, and more particularly movements of lips and eyes in model figures, such as for example may be used in the production of animated puppet films, or may be used as advertising devices.

The invention provides a model figure in which a visible part of the figure is movable so that the figure may be used for related sound and movement displays, which movable part is linked to an electromechanical transducer energised by electric signals derived from a sound effect, in such a manner that the extent of movement of the movable part by the transducer corresponds to the sound from which the electric signals are derived.

Preferably the movable part is a lip, the lip being linked to the electromechanical transducer in such a way that movement of the lip is proportional to the amplitude of the electric signals applied to the transducer.

Preferably two movable lips are provided linked respectively to two electromechanical transducers.

Preferably the lips comprise flexible material bounding the mouth of the model. Preferably each lip is connected to its respective electromechanical transducer by a pivoted lever, whereby mechanical amplification or reduction of the output of the transducer may be effected by appropriate pivoting of the lever.

The invention includes a model figure in which the movable part is an eye, the eye being linked to the electromechanical transducer in such a way that movement of the eye is proportional to the amplitude of the electrical signals applied to the transducer.

Preferably both eyes and lips are provided each linked to electromechanical transducers.

Preferably an averaging electrical circuit is provided for averaging the electric signals representing sound which, after appropriate amplification, are applied to an electromechanical transducer.

Preferably both lips and eyes are movable and linked respectively to three electromechanical transducers and in which the electric signals representing sound are divided into three channels, each of which includes an averaging electrical circuit supplying the respective transducers.

Preferably the averaging circuit in the channel supplying the electromechanical transducer for the eyes averages over a range of frequencies greater than that of the averaging circuits in the other two channels.

Conveniently the electrical signals representing sound are also connected to an appropriate amplifier and a loud speaker. Preferably, the loud speaker is accommodated within the head of the model figure.

A specific construction of model figures, and electronic supply equipment therefor, embodying the invention will now be described by way of example and with reference to the accompanying drawings in which.

Figure 1:
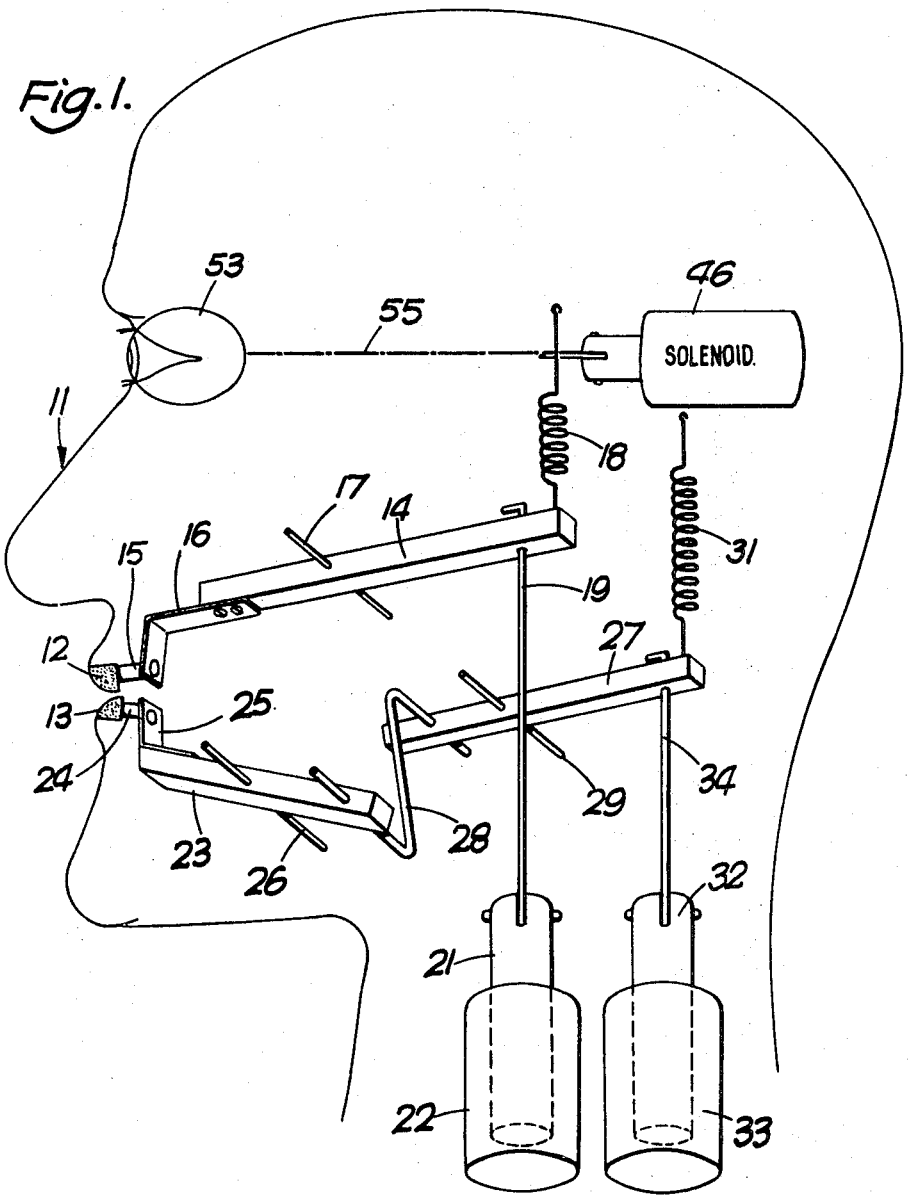
FIG. 1 is a diagrammatic sectional view of the head of a model figure.

In this example, a model head 11 is formed with flexible lips, upper lip 12 and lower lip 13. The upper lip 12 is linked to a lever arm 14 by a peg 15 secured in the lip 12 and an L-shaped strip 16. The lever arm 14 is pivoted at 17 on a rod secured in the material forming the head 11.

A light tension spring 18 biases the lever arm 14 towards a position corresponding to the lip 12 being closed. A wire 19 connects the end of the lever arm 14 remote from the lip 12 to the armature 21 of a solenoid 22.

The lower lip 13 is linked to a lever arm 23 by a peg 24 and metal strip 25. The lever arm 23 is pivoted at 26 and coupled, at its end remote from the lip 13, to another lever arm 27 by linkage 28. The linkage 28 is pivotally attached to each of the lever arms 23 and 27. Lever arm 27 is pivoted at 29, biassed by a light tension spring 31 at its end remote from the lip 13 and connected at that end to the armature 32 of a solenoid 33 by a wire 34. The double lever arm arrangement for the lower lip 13 is provided to reverse the movement of lip 13 in response to the action of the solenoid 33, which is energised by identical signals to the solenoid 22.

If the lips 12 and 13 are made from flexible resilient material such as rubber, it may be possible to dispense with the biassing springs 18 and 31.

The eyes 53 of the figure are also movable and connected to a solenoid 46 by a similar linkage arrangement indicated diagrammatically by dotted line 55.

Figure 2:
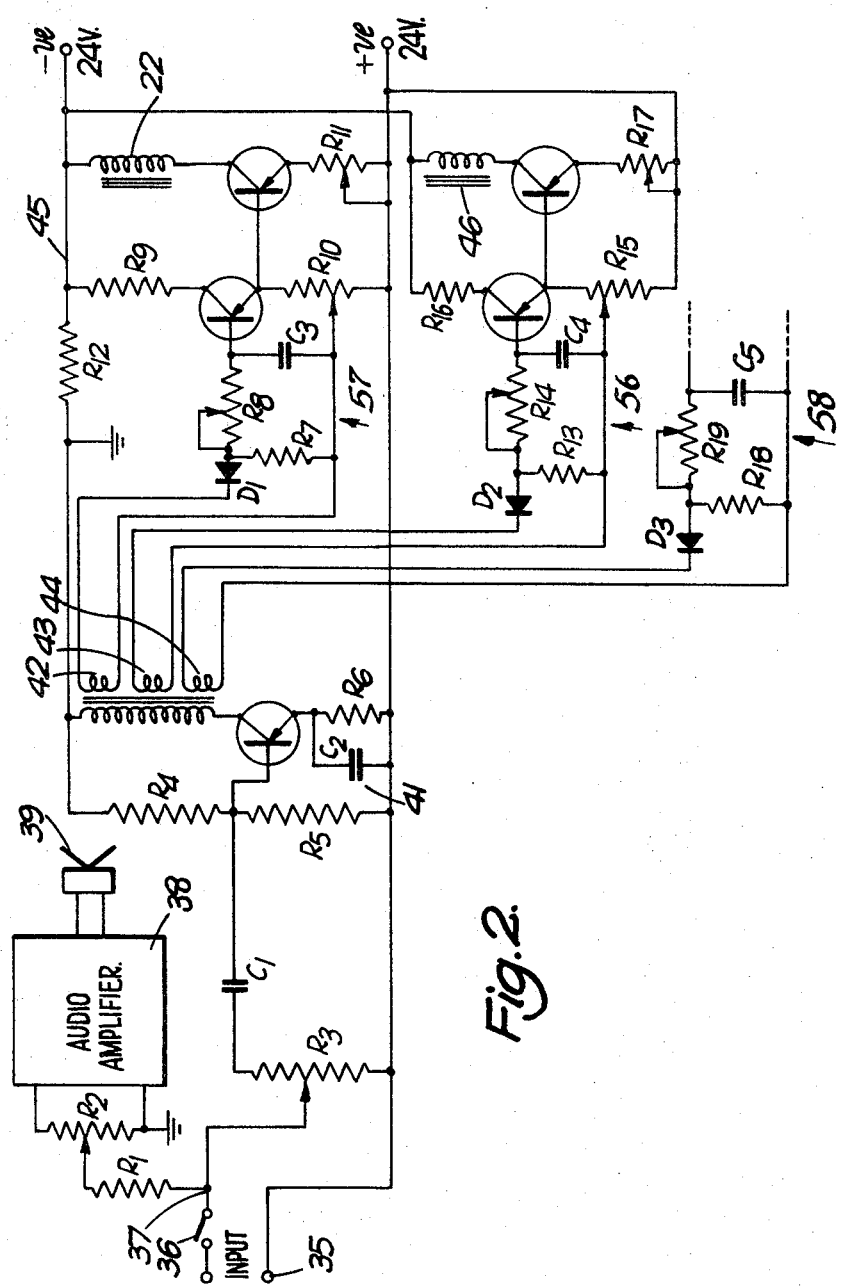
FIG. 2 is a circuit diagram showing the principal components of the electronic circuits.

FIG. 2 illustrates the electrical equipment employed in this example for actuating the solenoids 22 and 33. Electrical signals representing sound such as speech or singing are fed to an input 35. These sounds may be derived for example from a microphone, tape recording or gramophone record. When switch 36 is closed, the input electrical signals are branched at 37. One branch feeds a suitable audio amplifier 38, the output of which drives a speaker 39. The other branch feeds an audio amplifier 41, the output from which is divided into three channels 42, 43 44.

The electrical signals in channel 42 are rectified by diode D1 and the output across the resistor R7 is fed to an output amplifier 45 via an averaging network 57 comprising variable resistor R8 and capacitor C3. The output of the amplifier 45 is applied across solenoid 22.

Channel 44 has an identical circuit arrangement except that the output from the output amplifier (not shown) is applied across solenoid 33.

The outputs from these channels 42 and 44 thus cause movement of the lips 12 and 13 respectively in accordance with the electrical signals and the amount of movement of the lips corresponds to the amplitude of the signals. The averaging circuits are arranged to eliminate continual quivering of the lips. For realistic movements of the lips 12, 13, the upper lip 12 should move with a smaller amplitude than the lower lip 13 and this is achieved, in this example, by appropriate adjustment of the effective length of the lever arms 14, 23 and 27.

Provision for electrical control of the amplitude of movement of the solenoids is made by the variable resistors R10 and its equivalent in channel 44. Variable resistor R11 and its equivalent in channel 44 acts as limiters for limiting the maximum current applied to the solenoids 22 and 23.

Channel 43 is provided for effecting movement of eyes 53 in the model figure 11. The circuit of channel 43 is similar to those of channels 42 and 44 but operates an eye solenoid 46. However, it is desirable that the eyes should move more slowly than the lips and consequently the averaging circuit 56 provided by resistor R14 and capacitor C4 is arranged to extend over a wider range of frequencies than that provided by resistor R8 and capacitor C3 or resistor R19 and capacitor C5.

The averaging circuit comprised by resistor R14 and capacitor C4 is arranged for example so that the eyes move slowly to a central position whilst speech is being received but move to one side slowly when the speech dies away.

Figure 3:
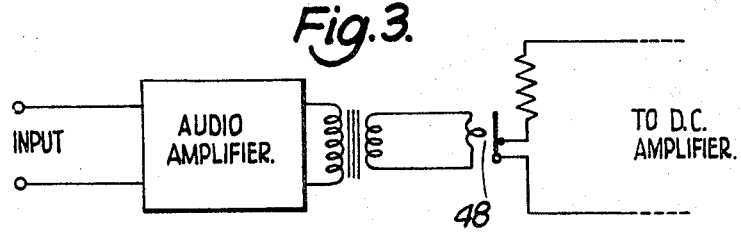
FIG. 3 illustrates diagrammatically a modified electronic arrangement.

FIG. 3 illustrates a modification in which the diode rectifier and averaging circuit are replaced by a light sensitive resistor 48 such as a rayvae. This is shown for one channel only but may be employed on each of the channels.

Figure 4:
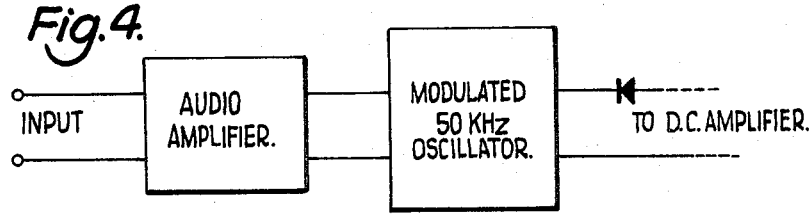
FIG. 4 illustrates diagrammatically another modified electronic arrangement.

FIG. 4 illustrates an alternative modification in which the audio signals are carried on a 50 kHz. signal from an oscillator, the output of which is subsequently demodulated and processed by channels 42, 43, 44.

Figure 5:
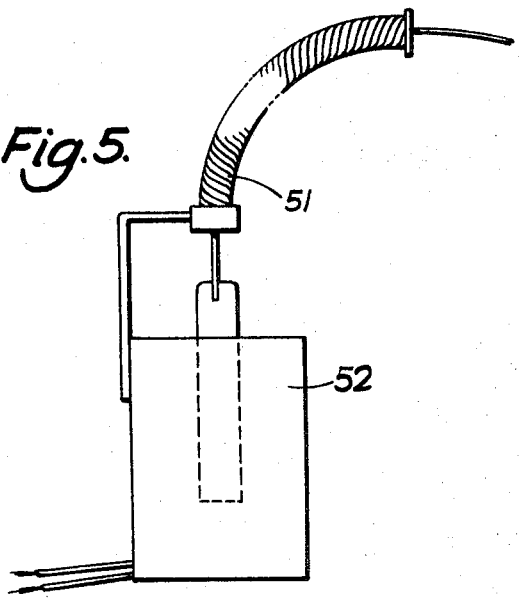
FIG. 5 is a side elevation partly broken away of a modified part of the model figure shown in FIG. 1.

FIG. 5 illustrates a modified arrangement for the solenoid operation where the head is too small for accommodating the solenoids. FIG. 5 shows a Bodwen cable 51 arranged for actuation by solenoid 52 so that the solenoid may be located remote from the head 11.

The following are values of electrical components shown in FIG. 2:

| Resistors: | Ohms |
|---|---|
| R1 | 500 |
| R2 | 10K |
| R3 | 10K |
| R4 | 220K |
| R5 | 56K |
| R6 | 150 |
| R7 | 3300 |
| R8 | 5K |
| R9 | 500 |
| R10 | 500 |
| R11 | 25 |
| R12 | 22K |
| R13 | 3300 |
| R14 | 5K |
| R15 | 500 |
| R16 | 500 |
| R17 | 25 |
| R18 | 3300 |
| R19 | 5K |

| Capacitors: | Microfarads |
|---|---|
| C1 | 2 |
| C2 | 200 |
| C3 | 25 |
| C4 | 1500 |
| C5 | 25 |

The invention is not restricted to the details of the foregoing example.

I claim:
1. A model figure for use in related sounds and movement displays comprising a visible movable part, an electro mechanical transducer for moving said movable part, linking means linking said movable parts to said electromechanical transducer and energizing means for energizing said electromechanical transducer, said energizing means being responsive to electric signals derived from a sound effect whereby the extent of movement of said movable part from a rest position by said transducer corresponds to the sound from which the electric signals are derived and wherein an averaging electrical circuit is provided for averaging the electrical signals representing sound which, after amplification are applied to said electromechanical transducer.

2. A model figure as claimed in claim 1, in which said movable part is a lip, and said linking means links said lip to said electromechanical transducer to move said lip proportionally to the amplitude of the electric signals applied to said transducer.

3. A model figure as claimed in claim 1, which has both two movable lips and eyes provided and linked respectively to three electromechanical transducers and in which the electric signals representing sound are divided into three channels, each of which includes said averaging circuit supplying the respective transducers.

4. A model figure as claimed in claim 3, in which the averaging circuit in the channel supplying the electromechanical transducer for the eyes averages over a range of frequencies greater than that of the averaging circuits in the other two channels.

5. A model figure for use in related sounds and movement displays, which figure includes two movable lips linking means linking respectively the two movable lips to two electromechanical transducers;

energising means for energising the electromechanical transducer which energising means is responsive to electric signals derived from a sound effect;

rectifying means for rectifying staid electrical signals and an averaging electrical circuit connected to said rectifying means, said averaging electrical circuit including a variable resistor to vary the amplitude of the electric signal applied to the transducer;

and amplifying means connected to the averaging electrical circuit for amplifying the electric signal from said averaging means before applying the electric signal to the electromechanical transducer.

6. A model figure as claimed in claim 5, wherein there is further provided eyes linked to a third electromechanical transducer and similarly responsive to said electric signals derived from said sound effect.

References Cited

UNITED STATES PATENTS

| 1,920,027 | 7/1933 | Wilhelm | 46—245 |
| 2,324,774 | 7/1943 | Henry | 46—245 |
| 3,421,254 | 1/1969 | Ryan et al. | 46—171 |

FOREIGN PATENTS

| 701,036 | 12/1953 | Great Britain. |

LOUIS G. MANCENE, Primary Examiner

D. L. WEINHOLD, Jr., Assistant Examiner